United States Patent
Berestov et al.

(10) Patent No.: US 7,557,826 B2
(45) Date of Patent: Jul. 7, 2009

(54) METHOD FOR DEVICE SPECTRAL SENSITIVITY RECONSTRUCTION

(75) Inventors: Alexander Berestov, San Jose, CA (US); Ted J Cooper, Sunnyvale, CA (US); Kenichi Nishio, Yokohama (JP); Farhan A. Baqai, Fremont, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 599 days.

(21) Appl. No.: 11/398,196

(22) Filed: Apr. 4, 2006

(65) Prior Publication Data
US 2007/0229666 A1    Oct. 4, 2007

(51) Int. Cl.
  H04N 17/00 (2006.01)
  H04N 17/02 (2006.01)
  H04N 5/235 (2006.01)
  H04N 3/14 (2006.01)
  H04N 5/335 (2006.01)
  H04N 1/46 (2006.01)
  H01J 40/14 (2006.01)
  H01L 27/00 (2006.01)

(52) U.S. Cl. ............... 348/188; 348/187; 348/272; 348/273; 348/229.1; 348/230.1; 250/208.1; 250/226; 358/504

(58) Field of Classification Search .......... 348/272, 348/180–191, 273, 229.1; 250/208.1, 226; 358/504
See application file for complete search history.

(56) References Cited

U.S. PATENT DOCUMENTS

| | | | |
|---|---|---|---|
| 6,538,242 B1 * | 3/2003 | Kuno et al. | 250/208.1 |
| 6,556,932 B1 * | 4/2003 | Mestha et al. | 702/76 |
| 6,654,493 B1 * | 11/2003 | Hilliard et al. | 382/167 |
| 6,690,465 B2 * | 2/2004 | Shimizu et al. | 356/326 |
| 7,227,122 B2 * | 6/2007 | Arai | 250/226 |
| 7,236,195 B2 * | 6/2007 | Quan et al. | 348/273 |
| 7,312,829 B2 * | 12/2007 | Wilsher | 348/384.1 |

(Continued)

OTHER PUBLICATIONS

Ali Alsam et al., "Recovery Spectral Sensitivities with Uncertainty", 2002, pp. 22-26.

(Continued)

*Primary Examiner*—Jason Chan
*Assistant Examiner*—Michael Osinski
(74) *Attorney, Agent, or Firm*—Haverstock & Owens LLP (57) ABSTRACT

A method and system are provided for approximating spectral sensitivities of a particular image sensor, the image sensor having a color filter array positioned over the image sensor. In one example of the method, the method involves measuring spectral sensitivities of a set of image sensors each having a color filter array positioned over the image sensor, calculating mean spectral sensitivities of the set of image sensors for each color within the color filter array, measuring outputs of a particular image sensor when capturing a picture of a plurality of color patches under a first illuminant and calculating spectral sensitivities of the particular image sensor using the mean spectral sensitivities and the output of the particular image sensor. In some embodiments, the method further comprises utilizing the calculated spectral sensitivities to determine outputs of the particular image sensor under a second illuminant. In some embodiments, the method further comprises utilizing the calculated spectral sensitivities to calibrate a camera including the image sensor.

48 Claims, 5 Drawing Sheets

U.S. PATENT DOCUMENTS

2006/0098096 A1* 5/2006 Gupta et al. ................ 348/188

OTHER PUBLICATIONS

Kobus Barnard et al., "Camera Characterization for Color Research", pp. 152-163, vol. 27, No. 3, Jun. 2002.

Graham D. Finlayson et al., "Recovering Device Sensitivities with Quadratic Programming", *The Sixth Color Imaging Conference: Color Science, Systems, and Applications*, pp. 90-95.

Ali Alsam et al., "Recovering Spectral Sensitivities with Uncertainty", 2002, pp. 22-26.

Kobu Barnard et al., "Camera Characterization for Color Research", pp. 152-163, vol. 27, No. 3, Jun. 2002.

* cited by examiner

METHOD FOR DEVICE SPECTRAL SENSITIVITY RECONSTRUCTION

FIELD OF THE INVENTION

The present invention relates to digital cameras. More particularly, the present invention relates to calibrating digital cameras using measured statistical data of a set of cameras.

BACKGROUND OF THE INVENTION

The quality of an image captured by a color imaging system primarily depends on three factors—sensor spectral sensitivity, illumination and object scene. Illumination is important to be known. However, the spectral sensitivity characteristics are critical to the success of imaging applications, and are necessary for the optimal design of the imaging system under practical constraints. Ultimately, the human visual system subjectively judges image quality.

A digital still camera (DSC) or video camera (camcorder) has a sensor that is covered by a color filter array (CFA) to create pixel locations. A DSC typically uses red, green and blue (RGB) filters to create their image. Most current camcorders typically use cyan, magenta, yellow and green (CMYG) filters for the same purpose.

A conventional sensor is a charge-coupled device (CCD) or complimentary metal oxide semiconductor (CMOS). An imaging system focuses a scene onto the sensor and electrical signals are generated that correspond to the scene colors that get passed through the colored filters. Electronic circuits amplify and condition these electrical signals for each pixel location and then digitize them. Algorithms in the camera then process these digital signals and perform a number of operations needed to convert the raw digital signals into a pleasing color image that can be shown on a color display or sent to a color printer.

Each color camera has a unique sensor, CFA, and analog electronics system. The sensor and CFA have part-to-part variations. Accordingly, the electronic system needs to be calibrated for each camera. The goal is to make a "real world" scene captured with different cameras look the same when rendered on a display device. In order to calibrate an individual camera, the properties of the individual camera's primary color channels (CMYG for a camcorder; RGB for a DSC) need to be measured so that the individual camera's response to known colors can be quantized.

Color cameras require multiple classes of sensors with different spectral sensitivities. By placing CFA's in series with sensors, usually on a pixel-by-pixel basis, such multiple classes can be created. When the color filters are placed in a mosaic pattern, one color per pixel, the cameras are referred to as CFA cameras.

Cameras rely on illumination to capture information of an object scene. Cameras are utilized and calibrated under a variety of illuminants. Estimating how information obtained from under one illuminant would transform under another illuminant is a challenge.

Sensor characteristics, which consist of electronic sensor, color filter and optical lens, are the critical parts in the design of digital color cameras. A camera is the input end in a color input-output system. Thus, its capability to acquire precise signals under a noisy environment can make significant contributions to the processing and output image quality.

More and more attention is being paid to spectral-based approaches, where the input signal and the output signal are all treated as a spectral power distribution. For example, the object surface reflectance is captured spectrally, and rendered or printed spectrally to match the original surface characteristics.

Spectral sensitivity may be obtained via direct measurement of a particular camera output. The spectral sensitivity functions can then be used to determine the mapping relationship between device output signals and object color perception values for any samples under any interested illuminant. Direct measurement of spectral sensitivities with a spectroradiometer and monochromator gives rather accurate results. It is well known how a digital camera can be calibrated if the SS curve for each camera is known. Unfortunately, directly measuring the SS curve from a set of cameras is both time-consuming and expensive.

SUMMARY OF THE INVENTION

What is needed is an improved system having features for addressing the problems mentioned above and new features not yet discussed. Broadly speaking, the present invention fills these needs by providing a method and system for camera spectral sensitivity (SS) reconstruction from capturing a picture under a known illuminant of a set of known color patches. It should be appreciated that the present invention is able to be implemented in numerous ways, including as a method, a process, an apparatus, a system or a device. Inventive embodiments of the present invention are summarized below.

In one embodiment, a method is provided for approximating spectral sensitivities of an image sensor, the image sensor having a color filter array positioned over the image sensor. The method comprises measuring an output of the image sensor when capturing a picture of a set of color patches under a first illuminant and calculating spectral sensitivities of the image sensor based on the measured output.

In another embodiment, a method is provided for approximating spectral sensitivities of a particular image sensor, the image sensor having a color filter array positioned over the image sensor. The method comprises measuring spectral sensitivities of a set of image sensors each having a color filter array positioned over the image sensor, measuring outputs of a particular image sensor when capturing a picture of a plurality of color patches under a first illuminant and calculating spectral sensitivities of the particular image sensor using the output of the particular image sensor and the spectral sensitivities of the set of image sensors.

In a further embodiment, a method is provided for approximating spectral sensitivities of a particular image sensor, the image sensor having a color filter array positioned over the image sensor. The method comprises measuring spectral sensitivities of a set of image sensors each having a color filter array positioned over the image sensor, calculating mean spectral sensitivities of the set of image sensors for each color within the color filter array, measuring outputs of a particular image sensor when capturing a picture of a plurality of color patches under a first illuminant and calculating spectral sensitivities of the particular image sensor using the mean spectral sensitivities and the output of the particular image sensor.

In still another embodiment, a method is provided for approximating a spectral sensitivity curve of a particular image sensor, the image sensor having a color filter array positioned over the image sensor. The method comprises measuring spectral sensitivities of a set of image sensors each having a color filter array positioned over the image sensor, calculating mean spectral sensitivities of the set of image sensors for each color within the color filter array, calculating standard deviation of the spectral sensitivities of the set of image sensors for each color within the color filter array, measuring outputs of a particular image sensor when capturing a picture of a plurality of color patches under a first illuminant, dividing the mean spectral sensitivities into intervals and calculating a spectral sensitivity curve for each interval using the mean spectral sensitivities, the standard deviation and outputs of the particular image sensor, under a first illuminant.

In yet another embodiment, an image capturing system is provided having a color filter array positioned over an image sensor. The image capturing system comprises an image sensing module to detect an input light, wherein the imaging sensing module includes a color filter array having a spectral sensitivity, a processing module coupled to the image sensing module, wherein the processing module is configured to measure spectral sensitivities of a set of image sensors each having a color filter array positioned over the image sensor, calculate mean spectral sensitivities of the set of image sensors for each color within the color filter array, to measure outputs of a particular image sensor when capturing a picture of a plurality of color patches under a first illuminant, to calculate spectral sensitivities of the particular image sensor using the mean spectral sensitivities and the outputs of the particular image sensor.

In still another embodiment, a processing module of a particular camera is provided, having a color filter array positioned over an image sensor. The processing module is configured to measure spectral sensitivities of a set of image sensors each having a color filter array positioned over the image sensor, calculate mean spectral sensitivities of the set of image sensors for each color within the color filter array, to measure outputs of a particular image sensor when capturing a picture of a plurality of color patches under a first illuminant, to calculate spectral sensitivities of the particular image sensor using the mean spectral sensitivities and the outputs of the particular image sensor.

The invention encompasses other embodiments are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION OF THE PREFERRED EMBODIMENT(S)

An invention for a method and system for camera spectral sensitivity (SS) reconstruction from a limited number of known color patches is disclosed. Numerous specific details are set forth in order to provide a thorough understanding of the present invention. It will be understood, however, to one skilled in the art, that the present invention may be practiced with other specific details.

The method involves constructing SS curves for a camera system including a color filter array positioned over an image sensor so that an output of the image sensor can be approximated under different illuminants. The method applies to both digital still cameras (DSCs) and to video cameras (camcorders), even though the two different types may use different color filter arrays (CFAs) to generate their images. The two main types of color filter arrays are RGB for DSCs and CMYG for video camcorders. This method of modeling the SS curves works equally well with either CFA technique. Note, however, that the RGB system is generally easier to implement because the RGB system has fewer parameters that require estimation. Thus, for simplicity of explanation, equations and discussions will be directed toward an RGB system, yet will be applicable to both an RGB system and a CMYG system.

All the internal specifications of a camera's digital-processing pipeline do not have to be known in order to implement this method. However, the reconstruction method does assume that a user (e.g., a manufacturer) of the method desires to map known input color patches that can be measured under tightly controlled conditions to specify output channel values. Color patches are commonly used as known input in the process of calibrating a camera's output. A color patch is placed outside of the camera in front of the lens. The user will vary the parameters of signal flow within the camera until the desired mapping has the optimum effect.

To perform the mapping, the reconstruction system needs to know the specific RGB values that a specific image sensor under a specific illuminant will produce. A "real world" image can take place under many different illuminants. From an incandescent illuminant to a very blue illuminant in the afternoon, the RGB values will vary strongly according to the illuminant for the same patch. Ideally, to predict the camera digital RGB values, the SS curve is known for each camera. For a known illuminant, a known color patch with a known reflectance and known SS curve, the RGB values can be determined. Once an image sensor's SS curves are known, then under any illuminant, the RGB values associated with any patch can be predicted. Additionally, patches that have not been captured by the specific image sensor can be predicted if their characteristic reflectance spectrum has been measured.

The method of the present invention involves taking a picture with a specific image sensor of a set of known color patches under a known illuminant. The output of the image sensor is then measured and this data is utilized to calculate and predict the output of the image sensor under other illuminants and other conditions.

Figure 1:
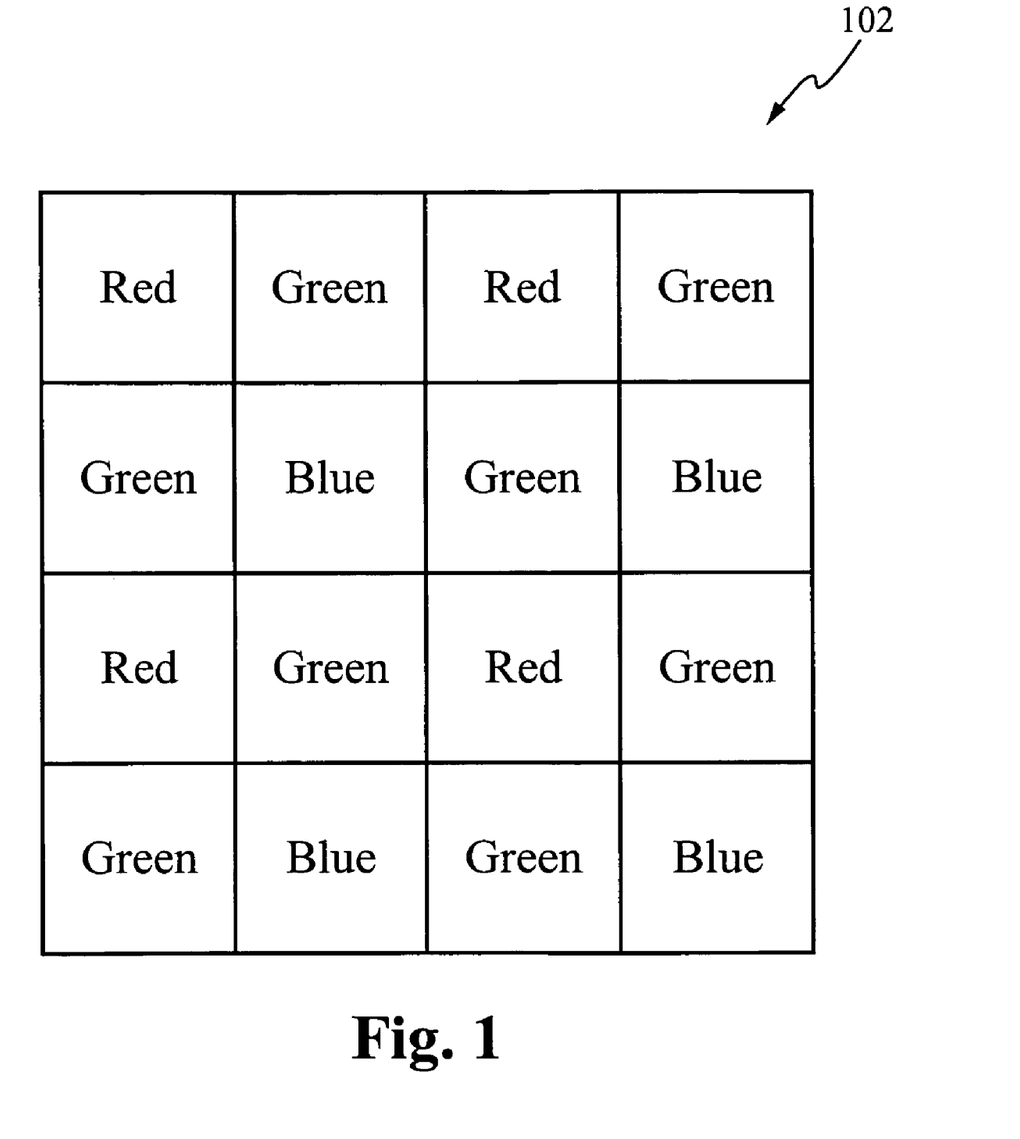
FIG. 1 is a color filter array (CFA), in accordance with an embodiment of the present invention.

FIG. 1 is a CFA 102, in accordance with an embodiment of the present invention. In a DSC or camcorder, there is a CFA positioned over the image sensor. Every pixel in the image sensor is covered with some color from the CFA. The CFA 102 of FIG. 1 has colors of red, green and blue. Each filter has a property called spectral sensitivity (SS).

Figure 2:
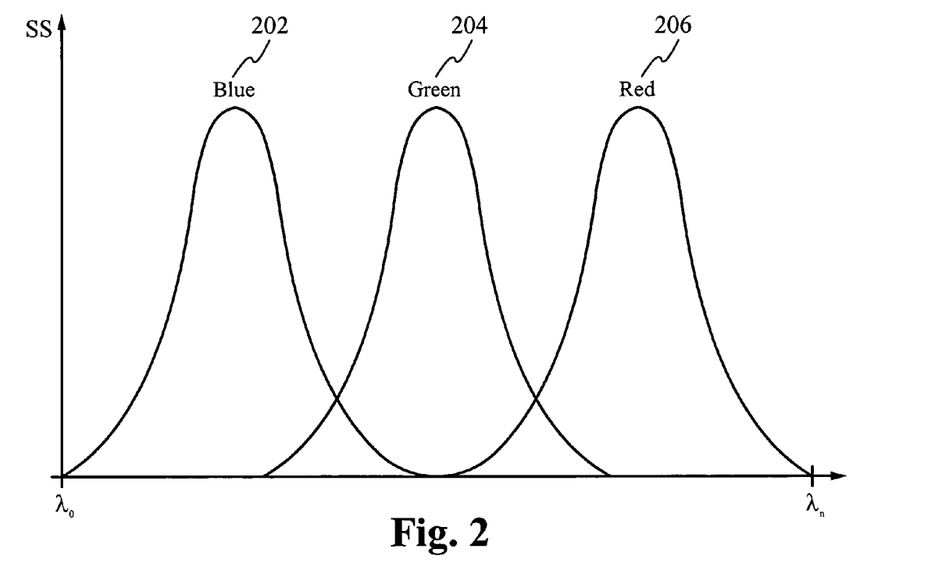
FIG. 2 shows sample SS curves for the CFA of FIG. 1, in accordance with an embodiment of the present invention.

FIG. 2 shows sample SS curves for the CFA of FIG. 1, in accordance with an embodiment of the present invention. The SS curves are a function of the wavelength $\lambda$. Each color has its own spectral sensitivity curve, including a blue SS curve 202, green SS curve 204 and red SS curve 206.

Figure 3:
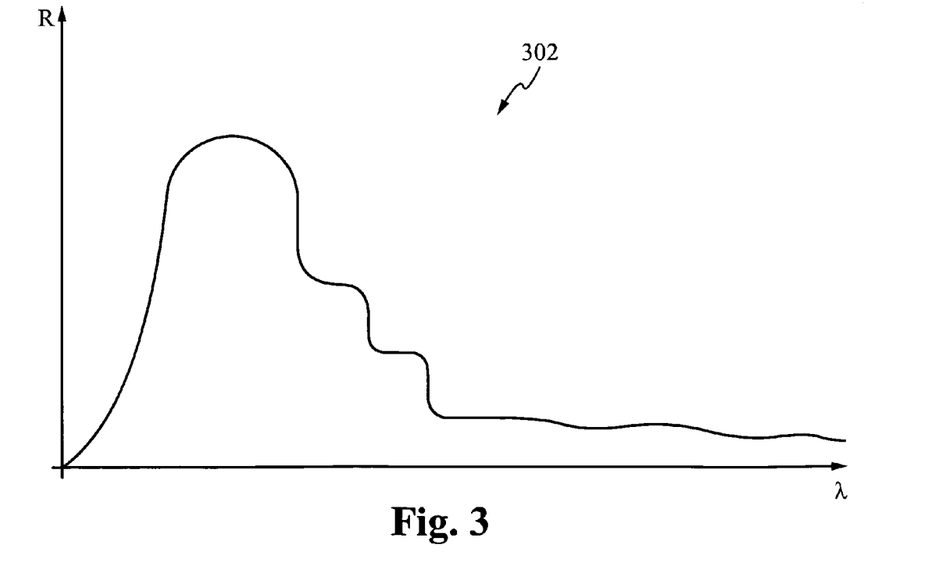
FIG. 3 is a sample reflectance R curve, in accordance with an embodiment of the present invention.

FIG. 3 is a sample reflectance R curve 302, in accordance with an embodiment of the present invention. Each object in a scene has a reflectance. Reflectance R is a function of the wavelength $\lambda$.

Figure 4:
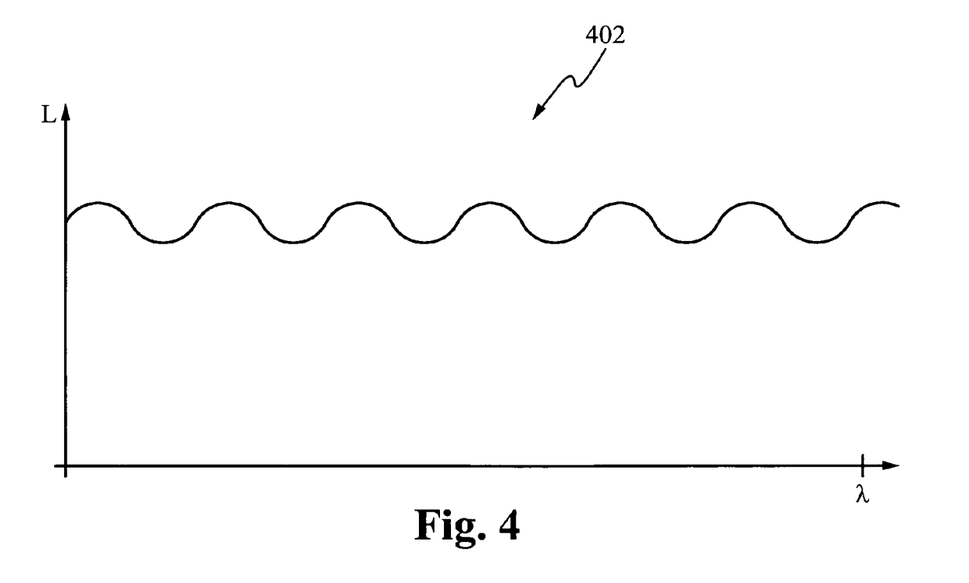
FIG. 4 is a sample illuminance L curve, in accordance with an embodiment of the present invention.

FIG. 4 is a sample illuminance L curve 402, in accordance with an embodiment of the present invention. Illuminance L is a function of the wavelength $\lambda$.

The camera measures an electrical signal from an image sensor. $D_A^k$ is an electrical output for one of the colors (red, green and blue) of the CFA and for each color patch K under a first illuminance A. Note that, in practice, this calculation is performed for each color of the CFA. For example, the image sensor analysis for RGB will have three of these $D_A^k$ calculations, an analysis for each color: red; green; and blue. A spectral sensitivity estimate needs to be estimated for each color (red, green and blue) of the CFA. As will be further explained below, an object is to be able to calculate an accurate output signal of the particular image sensor for each color under a different illuminant. Calculations for only one color are described herein for simplicity of explanation. However, in practice, the calculations described herein are performed for each color of the CFA.

The reconstruction method does not involve taking time consuming measurements of all the variables. In other words, the reconstruction system does not take measurements from pictures under varying illuminances (e.g., daylight, indoors, night).

For a particular camera, which has it's own particular image sensor, the reconstruction system captures a picture of the plurality of color patches under an illuminant. At the beginning of the calibration process or other development and correction process, the reconstruction system measures a certain number of image sensors with a spectrometer to obtain SS output curves of the image sensors within the set. These measurements provide statistics which are used in the output prediction process. Next, the reconstruction system estimates the spectral sensitivity of the particular image sensor. Then, the reconstruction system predicts the image sensor output with a different illuminance B using the following equation:

$$D_B^k = \int_{\lambda_0}^{\lambda_N} B(\lambda) SS(\lambda) R^k(\lambda) d\lambda. \quad \text{Eq. 1}$$

Electrical output signal $D$ under illuminance $B$.

In Eq. 1, $B(\lambda)$ is illuminance and is a function of wavelength $\lambda$. The value SS is the spectral sensitivity property for one color of a sensor. FIG. 2 is an example of this SS. The value R is the reflectance of light coming from the color filter. Reflectance R is a function of the wavelength $\lambda$. For the color patch k (k=1, . . . ,K) with the reflectance $R^k$, the image sensor output $D_B^k$ is calculated. The functions are multiplied and the integral is taken. The reconstruction system calculates the image sensor output $D_B^k$ for each color of the color filter array by knowing all these variables, the illuminance $B(\lambda)$, the spectral sensitivity $SS(\lambda)$ and the reflectance $R(\lambda)$, which are all functions of the wavelength $\lambda$.

The method involves taking K measurements for each color of the color filter array. The goal is to reconstruct K outputs for illuminant B. Some statistics are known. For example, assume that it is known that there are M image sensors. Preferably, M image sensors provide adequate representation of all image sensors in a product line. The following equations are useful to the calculations:

$$SS(\lambda) \cong \overline{SS(\lambda)} + \begin{cases} \Delta SS_1 \sigma^0(\lambda), & \lambda_0 \le \lambda \le \lambda_1 \\ \Delta SS_2 \sigma^0(\lambda), & \lambda_1 \le \lambda \le \lambda_2 \\ \vdots \\ \Delta SS_N \sigma^0(\lambda), & \lambda_{N-1} \le \lambda \le \lambda_N. \end{cases} \quad \text{Eq. 2}$$

Approximation of $SS$ for each $RGB$ color of the $CFA$ on $N$ spectral intervals.

Approximating SS, as in Eq. 2, involves first calculating very quickly and simply the mean function $\overline{SS(\lambda)}$ according to the following equation:

$$\overline{SS(\lambda)} = \frac{1}{M} \sum_{i=1}^{M} SS_i(\lambda). \quad \text{Eq. 3}$$

Mean spectral sensitivity function for each $RGB$ color of the $CFA$ obtained from $M$ sample sensors.

The reconstruction system calculates a mean function for each color, including red, green and blue. In other words, each color has its own spectral sensitivity curve. According to Eq. 2, approximating SS also involves calculating the standard deviation $\sigma^0(\lambda)$ of the spectral sensitivity for the image sensor set. The following equation defines the standard deviation:

$$\sigma^0(\lambda) = \frac{1}{\sigma_{max}} \sqrt{\frac{1}{M} \sum_{i=1}^{M} (SS_i(\lambda) - \overline{SS(\lambda)})^2}. \quad \text{Eq. 4}$$

Normalized standard deviation.

One example where the standard deviation is useful: if a particular sensor has a factory related problem, the SS curve may deviate up, and the standard deviation variable takes such an occurrence into consideration. Because it is squared, the standard deviation is an absolute variable.

The method uses the foregoing equations and statistics to calculate spectral sensitivities for a particular image sensor. For explanatory purposes, the following description describes the spectral sensitivity reconstruction for only one color within the color filter array. However, the following description generally applies to the other colors of the RGB system.

Figure 5A:
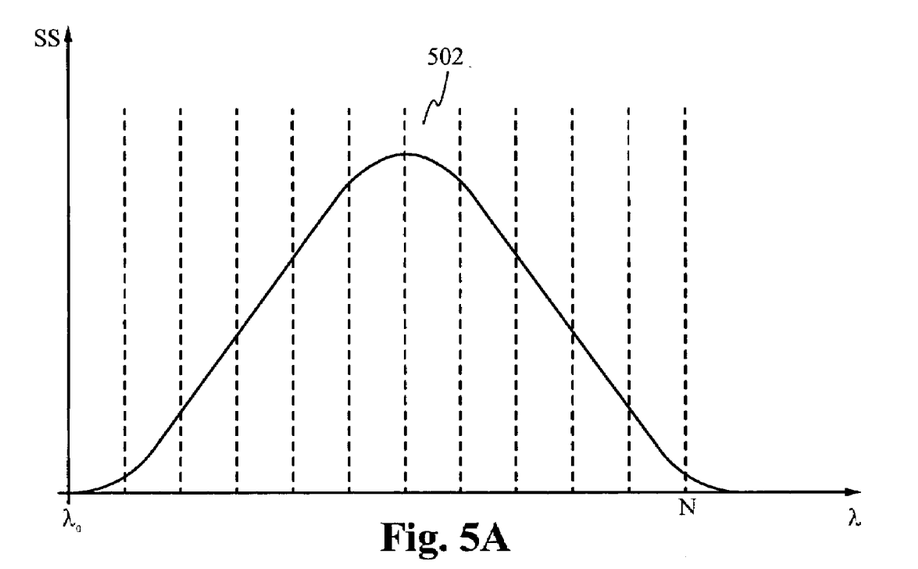
FIG. 5A is an average SS curve for one color of a CFA, in accordance with an embodiment of the present invention.

FIG. 5A is an average SS curve 502 for one color of a CFA, in accordance with an embodiment of the present invention. This average SS curve 502 has been divided into N intervals. Assume the spectral sensitivity $SS(\lambda)$ for a particular image sensor is the mean spectral sensitivity $\overline{SS(\lambda)}$ plus the standard deviation $\sigma^0(\lambda)$ multiplied by a coefficient $\Delta SS$, as in Eq. 2. This calculation will happen for each interval in order to approximate the entire SS curve.

Figure 5B:
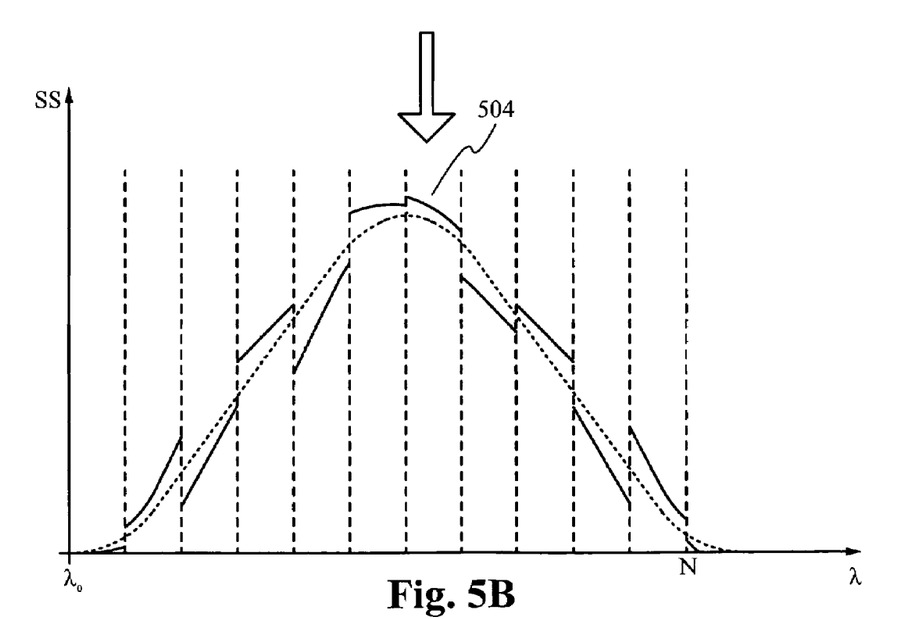
FIG. 5B shows an offset SS curve 504, which is the average SS curve of FIG. 5A after being offset within each interval to approximate the real measurement within each interval, in accordance with an embodiment of the present invention.

FIG. 5B shows an offset SS curve 504, which is the average SS curve 502 of FIG. 5A after being offset within each interval to approximate the real measurement within each interval, in accordance with an embodiment of the present invention. The integral of the whole range is the sum of the integrals of each range.

Notice that the SS curve is no longer smooth because each interval is an approximation. A goal is to have the integral of this approximation be equal to $D_A^k$. Instead of taking actual measurements, each measurement is approximated as the integral of an average SS plus the standard deviation multiplied by a coefficient, all done over N intervals. The following linear equation defines this approximation:

$$D_A^k = \int_{\lambda_0}^{\lambda_N} A(\lambda)SS(\lambda)R^k(\lambda)d\lambda \quad \text{Eq. 5}$$

$$\cong \int_{\lambda_0}^{\lambda_N} A(\lambda)\overline{SS(\lambda)}R^k(\lambda)d\lambda +$$

$$\Delta SS_1 \int_{\lambda_0}^{\lambda_1} A(\lambda)\sigma^0(\lambda)R^k(\lambda)d\lambda + \ldots +$$

$$\Delta SS_N \int_{\lambda_{N-1}}^{\lambda_N} A(\lambda)\sigma^0(\lambda)R^k(\lambda)d\lambda.$$

Linear equations approximating spectral sensitivity.

The coefficient ΔSS is a constant and can therefore be taken outside of the integral. For the sake of simplicity, the output from the image sensor having an average spectral sensitivity is as follows:

$$\int_{\lambda_0}^{\lambda_N} A(\lambda)\overline{SS(\lambda)}R^k(\lambda)d\lambda = G_A^k. \quad \text{Eq. 6}$$

Output of camera having average spectral sensitivity.

Also for simplicity, the standard deviation for one interval from Eq. 5 is defined as follows:

$$\int_{\lambda_{n-1}}^{\lambda_n} A(\lambda)\sigma^0(\lambda)R^k(\lambda)d\lambda = F_n^k. \quad \text{Eq. 7}$$

Standard deviation for each interval.

The method of the present invention involves taking a picture with a specific camera having a color filter array positioned over an image sensor of a set of known color patches under a known illuminant. The output of the image sensor is then measured and this data is utilized to calculate and predict the output of the camera under other illuminants and other conditions. The reconstruction system calculates the average output and the standard deviations from each statistics set for each color patch. Each average output from each statistics set for each color patch will be different. Next, the method involves solving the following system of linear equations:

$$\Delta SS_1 F_1^1 + \Delta SS_2 F_2^1 + \cdots + \Delta SS_N F_N^1 = D_A^1 - G_A^1 \quad \text{Eq. 8}$$

-continued $$\Delta SS_1 F_1^2 + \Delta SS_2 F_2^2 + \cdots + \Delta SS_N F_N^2 = D_A^2 - G_A^2$$

$$\vdots$$

$$\Delta SS_1 F_1^K + \Delta SS_2 F_2^K + \cdots + \Delta SS_N F_N^K = D_A^K - G_A^K.$$

System of linear equations of camera outputs for K color patches.

If the number of color patches equals the number of intervals, then the reconstruction system is able to find an exact solution of the system of linear equations. It is necessary to find the coefficients ΔSS. For example, given measurements taken from 100 image sensors, the reconstruction system is able to calculate the standard deviation $\sigma^0(\lambda)$ in advance. The output of the image sensor having average spectral sensitivity G (from Eq. 8 and Eq. 6) is known. Also, the electrical output signal D (from Eq. 8) is a known measurement. It is then necessary to calculate the coefficients ΔSS for each color patch. There are K equations for K color patches, and N coefficients for N intervals. If N equals K, the number of variables equals the number of equations. The reconstruction system can then solve the system of linear equations represented in Equation 8. If N is not equal to K, it is possible to find an approximate solution.

In Equation 8, note that the more intervals that the reconstruction system uses, the closer the system of equations provides a solution that is closer to the real spectral sensitivity SS. Seven color patches may be a practical number of color patches to use in the measurements and calculations under normal conditions. Accordingly, statistical information is used to approximate the spectral sensitivity SS.

In other words, the reconstruction system involves measuring the image sensor output under known conditions and a known illuminant and then using statistical information to approximate the spectral sensitivity of the image sensor.

As shown in FIG. 5A, the mean spectral sensitivity is broken down into intervals. As shown in FIG. 5B, for each interval, different coefficients ΔSS are used to move standard deviation curves at each interval up or down a certain offset of the mean spectral sensitivity curve in order to match the particular image sensor's output. With each new image sensor, a picture of the color patches under a known illuminant is taken. The system of linear equations is setup to approximate the output of the new image sensor as an output from an average image sensor plus some variations at different intervals. Spectral sensitivity intervals are an arbitrary length and can be adjusted as needed to get an accurate result. For example, a large interval can be used where the spectral sensitivity SS does not change much; a small interval can be used where the spectral sensitivity SS changes a large amount.

Figure 6:
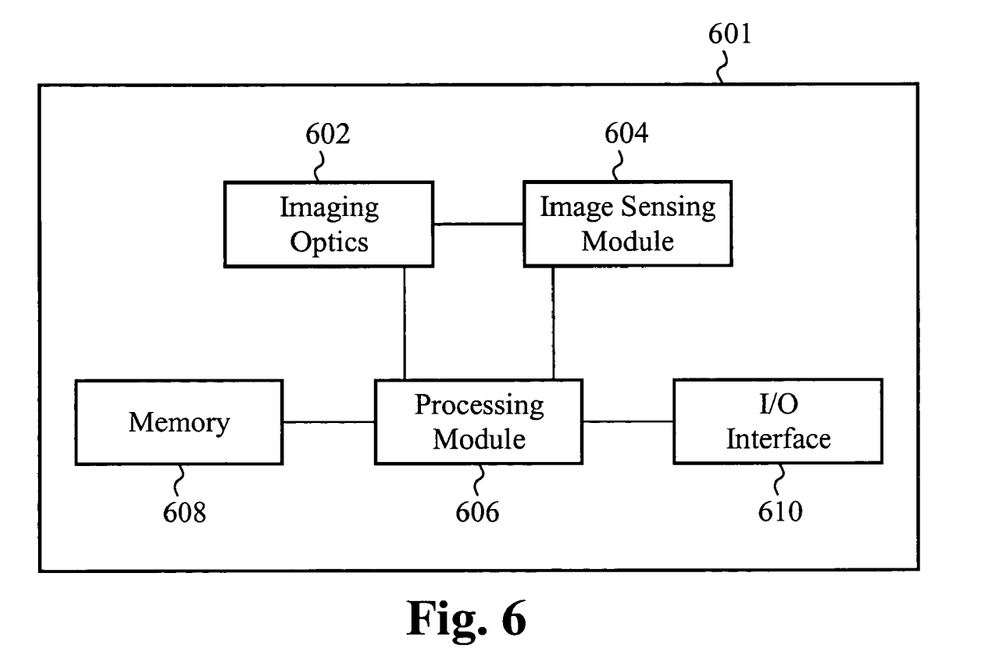
FIG. 6 illustrates a block diagram of an exemplary image capturing system configured to operate according to the reconstruction method, in accordance with an embodiment of the present invention.

FIG. 6 illustrates a block diagram of an exemplary image capturing system 601 configured to operate according to the reconstruction method, in accordance with an embodiment of the present invention. The image capturing system 601 is any device capable of capturing an image or video sequence, such as a camera or a camcorder. The image capturing system 601 includes imaging optics 602, an image sensing module 604, a processing module 606, a memory 608, and an input/output (I/O) interface 610.

The imaging optics 602 include any conventional optics to receive an input light representative of an image to be captured, to filter the input light, and to direct the filtered light to the image sensing module 604. Alternatively, the imaging optics 602 do not filter the input light. The image sensing module 604 includes one or more sensing elements to detect the filtered light. Alternatively, the image sensing module 604 includes a color filter array to filter the input light and one or more sensing elements to detect the light filtered by the color filter array.

The memory 608 can include both fixed and removable media using any one or more of magnetic, optical or magneto-optical storage technology or any other available mass storage technology. The processing module 606 is configured to control the operation of the image capturing system 601. The processing module 606 is also configured to perform the reconstruction method described above. The I/O interface 610 includes a user interface and a network interface. The user interface can include a display to show user instructions, feedback related to input user commands, and/or the images captured and processed by the imaging optics 602, the image sensing module 604, and the processing module 606. The network interface 610 includes a physical interface circuit for sending and receiving imaging data and control communications over a conventional network.

Advantageously, the method performed by the reconstruction system involves approximating the spectral sensitivity for a camera with a color filter array positioned over an image sensor. It should also be understood that this method is able to be used with only an image sensor, outside of a camera system. The reconstruction system uses measurements taken with one illuminant to then calculate the image sensor's output under other illuminants. In other words, the reconstruction system uses one set of data from the image sensor under a first illuminant to then calculate a new set of data under other illuminants. In contrast, methods of the prior art teach taking new measurements to obtain the image sensor output under a new illuminant. Such a measuring process is unduly time consuming and costly. In the reconstruction system of the present invention, on the other hand, the number of measurements needed to calculate an image sensor's output under a different illuminant is substantially reduced. The expensive measuring process of the prior art is thereby avoided.

Method and System Implementation

Portions of the reconstruction system may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art.

The invention may also be implemented by the preparation of application specific integrated circuits or by interconnecting an appropriate network of conventional component circuits, as will be readily apparent to those skilled in the art.

The reconstruction system includes a computer program product which is a storage medium (media) having instructions stored thereon/in which can be used to control, or cause, a computer to perform any of the processes of the reconstruction system. The storage medium can include, but is not limited to, any type of disk including floppy disks, mini disks (MD's), optical disks, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the reconstruction system includes software for controlling both the hardware of the general purpose/specialized computer or microprocessor, and for enabling the computer or microprocessor to interact with a human user or other mechanism utilizing the results of the reconstruction system. Such software may include, but is not limited to, device drivers, operating systems, and user applications. Ultimately, such computer readable media further includes software for performing the reconstruction method, as described above.

Included in the programming (software) of the general/specialized computer or microprocessor are software modules for implementing the teachings of the reconstruction method, including but not limited to, calculating mean spectral sensitivities of the set of image sensors each having a color filter array positioned over the image sensor, calculating standard deviation of the spectral sensitivities of the set of image sensors for each color within the color filter array, measuring outputs of a particular image sensor when capturing a picture of a plurality of color patches under a first illuminant, calculating the spectral sensitivity of the particular image sensor using the mean spectral sensitivities, the standard deviation and the output of the particular image sensor, and utilizing the calculated spectral sensitivity to determine outputs of the particular image sensor under a second illuminant, according to processes of the reconstruction method.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of approximating spectral sensitivities of a particular image sensor, the image sensor having a color filter array positioned over the image sensor, the method comprising:

measuring spectral sensitivities of a set of image sensors each having a color filter array positioned over the image sensor;

measuring outputs of a particular image sensor when capturing a picture of a plurality of color patches under a first illuminant; and calculating spectral sensitivities of the particular image sensor using the output of the particular image sensor and the spectral sensitivities of the set of image sensors.

2. The method of claim 1, further comprising utilizing the calculated spectral sensitivities to determine outputs of the particular image sensor under a second illuminant.

3. The method of claim 2, further comprising utilizing the calculated spectral sensitivities and the output under the second illuminant to calibrate a camera including the image sensor.

4. The method of claim 1, further comprising utilizing the calculated spectral sensitivities to calibrate a camera including the image sensor.

5. The method of claim 1, wherein calculating spectral sensitivities comprises calculating mean spectral sensitivities of the set of image sensors for each color within the color filter array.

6. The method of claim 1, wherein the measured spectral sensitivities are functions of a wavelength.

7. The method of claim 6, wherein the plurality of color patches includes K color patches, wherein calculating spectral sensitivities comprises solving a system of linear equations comprising dividing the mean spectral sensitivity curve into N intervals of the wavelength range.

8. The method of claim 7, wherein K does not equal N.

9. The method of claim 7, wherein K equals N.

10. The method of claim 5, wherein calculating mean spectral sensitivities comprises:
measuring spectral sensitivities of each image sensor in the set of image sensors; and
averaging the spectral sensitivities of each image sensor in the set of image sensors to obtain the mean spectral sensitivities.

11. The method of claim 1, wherein the set of image sensors includes M image sensors, wherein M image sensors provide adequate representation of image sensors in a product line.

12. A method of approximating spectral sensitivities of a particular image sensor, the image sensor having a color filter array positioned over the image sensor, the method comprising:
measuring spectral sensitivities of a set of image sensors each having a color filter array positioned over the image sensor;
calculating mean spectral sensitivities of the set of image sensors for each color within the color filter array;
measuring outputs of a particular image sensor when capturing a picture of a plurality of color patches under a first illuminant; and
calculating spectral sensitivities of the particular image sensor using the mean spectral sensitivities and the output of the particular image sensor.

13. The method of claim 12, further comprising utilizing the calculated spectral sensitivities to determine outputs of the particular image sensor under a second illuminant.

14. The method of claim 13, further comprising utilizing the calculated spectral sensitivities and the output under the second illuminant to calibrate a camera including the image sensor.

15. The method of claim 12, further comprising utilizing the calculated spectral sensitivities to calibrate a camera including the image sensor.

16. The method of claim 12, wherein calculating spectral sensitivities comprises calculating standard deviation of the spectral sensitivities of the set of image sensors for each color within the color filter array.

17. The method of claim 16, wherein the measured spectral sensitivities are functions of a wavelength.

18. The method of claim 17, wherein the plurality of color patches includes K color patches, wherein calculating the spectral sensitivities comprises solving a system of linear equations comprising dividing the mean spectral sensitivity curve into N intervals of the wavelength range.

19. The method of claim 18, wherein K does not equal N.

20. The method of claim 18, wherein K equals N.

21. The method of claim 20, wherein calculating the spectral sensitivities of the particular image sensor comprises:
calculating an average output based on an integral of the mean spectral sensitivity;
calculating an offset at each interval based on the standard deviation at each interval multiplied by a coefficient at each interval, wherein the coefficient at each interval is associated with a color patch; and
adding the average output at each interval to the offset at each interval, wherein the adding is performed at all K intervals.

22. The method of claim 21, wherein calculating a spectral sensitivity curve for each interval comprises adding an integral of the mean spectral sensitivity at each interval to the standard deviation multiplied by a coefficient for each interval, wherein the coefficient for each interval is associated with a color patch.

23. The method of claim 12, wherein calculating mean spectral sensitivities comprises:
measuring spectral sensitivities of each image sensor in the set of image sensors; and
averaging the spectral sensitivities of each image sensor in the set of image sensors to obtain the mean spectral sensitivities.

24. The method of claim 23, wherein the set of image sensors includes M image sensors, wherein M image sensors provide adequate representation of image sensors in a product line.

25. A method of approximating a spectral sensitivity curve of a particular image sensor, the image sensor having a color filter array positioned over the image sensor, the method comprising:
measuring spectral sensitivities of a set of image sensors each having a color filter array positioned over the image sensor;
calculating mean spectral sensitivities of the set of image sensors for each color within the color filter array;
calculating standard deviation of the spectral sensitivities of the set of image sensors for each color within the color filter array;
measuring outputs of a particular image sensor when capturing a picture of a plurality of color patches under a first illuminant;
dividing the mean spectral sensitivities into intervals; and
calculating a spectral sensitivity curve for each interval using the mean spectral sensitivities, the standard deviation and outputs of the particular image sensor, under a first illuminant.

26. The method of claim 25, further comprising combining each interval of the spectral sensitivity curve to obtain a calculated spectral sensitivity curve for the particular image sensor.

27. The method of claim 25, wherein the measured spectral sensitivities are functions of a wavelength.

28. The method of claim 27, wherein the plurality of color patches includes K color patches, wherein dividing the mean spectral sensitivities into intervals comprises dividing the mean spectral sensitivities into N intervals of the wavelength range.

29. The method of claim 28, wherein K does not equal N.

30. The method of claim 28, wherein K equals N.

31. The method of claim 28, wherein calculating the spectral sensitivity curve for each interval comprises adding the mean spectral sensitivities at each interval to the standard deviation multiplied by a coefficient at each interval, wherein the coefficient at each interval is associated with a color patch.

32. The method of claim 25, wherein calculating mean spectral sensitivities comprises:
measuring spectral sensitivities of each image sensor in the set of image sensors; and
averaging the spectral sensitivities of each image sensor in the set of image sensors to obtain the mean spectral sensitivities.

33. The method of claim 32, wherein the set of image sensors includes M image sensors, wherein M image sensors provide adequate representation of image sensors in a product line.

34. A computer-readable medium on which one or more instructions are recorded for approximating outputs of a particular image sensor under varying illuminants, the image sensor having a color filter array positioned over the image sensor, wherein the one or more instructions, when executed by one or more processors, cause the one or more processors to perform:

measuring spectral sensitivities of a set of image sensors each having a color filter array positioned over the image sensor;

calculating mean spectral sensitivities of the set of image sensors for each color within the color filter array;

measuring outputs of a particular image sensor when capturing a picture of a plurality of color patches under a first illuminant; and calculating spectral sensitivities of the particular image sensor using the mean spectral sensitivities and the output of the particular image sensor.

35. The computer-readable medium of claim 34, wherein the one or more instructions cause the one or more processors to further perform utilizing the calculated spectral sensitivities to determine outputs of the particular image sensor under a second illuminant.

36. The computer-readable medium of claim 35, wherein the one or more instructions cause the one or more processors to further perform utilizing the calculated spectral sensitivities and the output under the second illuminant to calibrate a camera including the image sensor.

37. The computer-readable medium of claim 34, wherein the one or more instructions cause the one or more processors to further perform utilizing the calculated spectral sensitivities to calibrate a camera including the image sensor.

38. The computer-readable medium of claim 34, wherein calculating spectral sensitivities comprises calculating standard deviation of the spectral sensitivities of the set of image sensors for each color within the color filter array.

39. An image capturing system having a color filter array positioned over an image sensor, the image capturing system comprising:

an image sensing module to detect an input light, wherein the imaging sensing module includes a color filter array having a spectral sensitivity;

a processing module coupled to the image sensing module, wherein the processing module is configured to measure spectral sensitivities of a set of image sensors each having a color filter array positioned over the image sensor, calculate mean spectral sensitivities of the set of image sensors for each color within the color filter array, to measure outputs of a particular image sensor when capturing a picture of a plurality of color patches under a first illuminant, to calculate spectral sensitivities of the particular image sensor using the mean spectral sensitivities and the outputs of the particular image sensor.

40. The image capturing system of claim 39, wherein the processing module is further configured to utilize the calculated spectral sensitivities to determine outputs of the particular image sensor under a second illuminant.

41. The image capturing system of claim 40, wherein the processing module is further configured to utilize the calculated spectral sensitivities and the output under the second illuminant to calibrate a camera including the image sensor.

42. The image capturing system of claim 39, wherein the processing module is further configured to utilize the calculated spectral sensitivities to calibrate a camera including the image sensor.

43. The image capturing system of claim 39, wherein calculating spectral sensitivities comprises calculating standard deviation of the spectral sensitivities of the set of image sensors for each color within the color filter array.

44. A processing module of a particular camera having a color filter array positioned over an image sensor, wherein the processing module is configured to measure spectral sensitivities of a set of image sensors each having a color filter array positioned over the image sensor, calculate mean spectral sensitivities of the set of image sensors for each color within the color filter array, to measure outputs of a particular image sensor when capturing a picture of a plurality of color patches under a first illuminant, to calculate spectral sensitivities of the particular image sensor using the mean spectral sensitivities and the outputs of the particular image sensor.

45. The processing module of claim 44, wherein the processing module is further configured to utilize the calculated spectral sensitivities to determine outputs of the particular image sensor under a second illuminant.

46. The processing module of claim 45, wherein the processing module is further configured to utilize the calculated spectral sensitivities and the output under the second illuminant to calibrate a camera including the image sensor.

47. The processing module of claim 44, wherein the processing module is further configured to utilize the calculated spectral sensitivities to calibrate a camera including the image sensor.

48. The processing module of claim 44, wherein calculating spectral sensitivities comprises calculating standard deviation of the spectral sensitivities of the set of image sensors for each color within the color filter array.

\* \* \* \* \*